Nov. 18, 1969            C. L. MURPHY            3,478,823
METHOD OF RECOVERING OIL USING SACRIFICIAL
AGENT AND VISCOSIFIER
Filed June 21, 1968
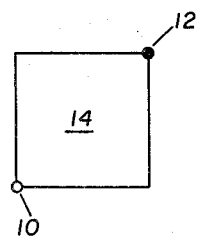
FIG. 1
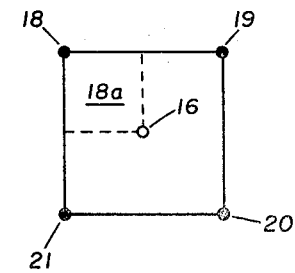
FIG. 2
FIG. 3
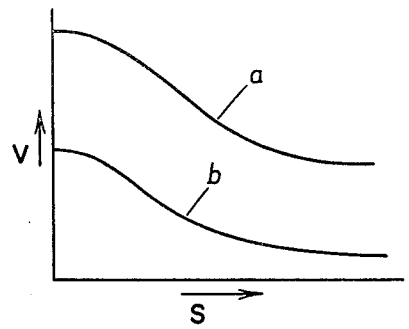
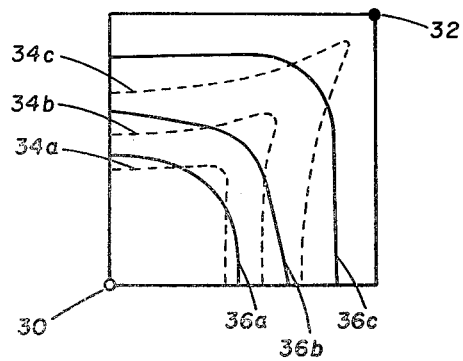
FIG. 4
CHARLES L. MURPHY
INVENTOR
BY *William D. Jackson*
ATTORNEY

United States Patent Office 3,478,823
Patented Nov. 18, 1969

3,478,823
METHOD OF RECOVERING OIL USING SACRIFICIAL AGENT AND VISCOSIFIER
Charles L. Murphy, Dallas, Tex., assignor to Mobil Oil Corporation, a corporation of New York
Filed June 21, 1968, Ser. No. 738,955
Int. Cl. E21b 43/22
U.S. Cl. 166—274                                 8 Claims

ABSTRACT OF THE DISCLOSURE

This specification discloses a secondary oil recovery process in which an aqueous liquid containing an adsorbing viscosifier is injected into an oil reservoir in order to displace oil therefrom. In addition a sacrificial agent is injected into the reservoir in a total amount sufficient to satisfy the adsorption sites within 0.05 to 0.50 of the displacement zone defined by the injection and production wells. The sacrificial agent preferentially adsorbs on the reservoir rock surfaces with respect to the viscosifier and adsorption of the viscosifier is reduced in a portion of the displacement zone adjacent the injection well. As a result the darcy viscosity of the flooding medium is decreased in this portion and the injectivity is increased.

Background of the invention

This invention relates to the recovery of oil from subterranean oil reservoirs and, more particularly, to new and improved techniques for enhancing the sweep efficiency of a secondary recovery process.

In the recovery of oil from oil-bearing reservoirs it usually is possible to recover only a minor portion of the original oil in place by the so-called primary recovery methods which utilize only the natural forces present in the reservoir. Thus, a variety of supplemental recovery techniques have been employed in order to increase the recovery of oil from subterranean reservoirs. In these supplemental techniques, which commonly are referred to as secondary recovery operations, although in fact they may be primary or tertiary in sequence of employment, fluid is introduced into the reservoir in order to displace the oil therein to a suitable production system through which the oil may be withdrawn to the surface of the earth. The displacing medium may be a gas, an aqueous liquid such as fresh water or brine, an oil-miscible liquid such as butane, or a water and oil-miscible liquid such as an alcohol. Generally, the most promising of the secondary recovery techniques involves the injection into the reservoir of an aqueous flooding medium, either alone or in combination with other fluids.

One difficulty which is often encountered in secondary recovery operations is the relatively poor sweep efficiency of the injected displacing liquid; that is, the tendency of the displacing liquid to channel through certain portions of the reservoir and to bypass other portions. Such poor sweep efficiency is occasioned by differences between the mobility of the injected displacing medium and the in-situ reservoir oil and also by permeability variations within the reservoir. In addition, poor sweep efficiency is caused by the tendency of the injected fluid to flow preferentially in the direction of the one or more production wells associated with an injection well. The fluid, as it is introduced into the injection well, flows radially outwardly from the well through the reservoir. However, at a relatively short distance from the injection well the injected fluid departs from this radial flow geometry and tends to follow the higher pressure gradients existing within the reservoir. These pressure gradients extend in generally straight lines between the injection well and the production wells and tend to induce the flow of fluid along these lines.

Various techniques have been proposed in order to improve the sweep efficiency of the injected displacing fluid and thus avoid premature breakthrough. One technique for increasing sweep efficiency involves the utilization of a relatively viscous displacing liquid. Thus, in waterflooding operations, for example, thickening agents have been added to at least a portion of the floodwater in order to increase the viscosity thereof. The viscosity of the displacing liquid may be increased prior to its injection into the reservoir. Alternatively, the viscosity of the liquid displacing medium may be increased in-situ, in order to avoid a reduction in injectivity at the injection wells. For example, in U.S. Patent No. 3,208,518 to John T. Patton, there is disclosed a waterflooding process in which the viscosity of the aqueous displacing medium is increased in-situ through the use of high molecular weight ionic polymers under controlled pH conditions. Another technique whereby the viscosity of the aqueous displacing medium may be increased in-situ involves the injection of a shear-thinning liquid. Thus, as disclosed in U.S. Patent No. 3,292,696 to B. B. Sandiford, an aqueous solution of hydroxyethyl cellulose which exhibits a relatively low viscosity at high shear rates may be injected in order to displace oil from the formation.

Another technique for obtaining increased sweep efficiency is disclosed in U.S. Patent No. 3,372,748 to E. L. Cook. This technique involves the injection of a relatively viscous, dilute aqueous polymer solution which is followed by a slug of a dilute, aqueous caustic solution. The caustic solution effects desorption of polymer previously adsorbed on the reservoir rock surfaces and redeposits the polymer in portions of the reservoir not previously contacted by the polymer solution. The redeposited polymer acts to reduce the permeability of portions of the reservoir, thus forcing floodwater into previously uninvaded areas of the reservoir.

Summary of the invention

In accordance with the present invention, there is provided a new and improved technique for the secondary recovery of oil. The invention is practiced in a subterranean reservoir which is penetrated by spaced injection and production wells defining a displacement zone within the reservoir. In carrying out the invention a thickened aqueous liquid containing an adsorbing viscosifying agent is injected into the reservoir through the injection well in order to displace oil within the reservoir in the direction of the production well or wells associated with the injection well. In addition, a sacrificial agent which preferentially adsorbs on the reservoir rock surfaces with respect to the viscosifier is introduced into the reservoir through the injection well. The sacrificial agent may be introduced into the reservoir prior to the thickened aqueous flooding medium or it may be contained in the thickened liquid. The sacrificial agent is injected in an amount sufficient to satisfy the adsorption sites within 0.05 to 0.50 of the displacement zone and preferably within 0.10 to .25 of the displacement zone. Within this portion of the displacement zone, adsorption of the viscosifier is decreased thus decreasing the darcy viscosity of the flooding medium. As a result, injectivity is increased while enhancing radial flow of the injected flooding medium and the sweep efficiency of the process. In a preferred embodiment of the invention the viscosifier is one which imparts shear-thinning properties to the flooding medium, thus further enhancing radial flow from the injection well into the formation.

Brief description of the drawings

FIGURES 1 and 2 are illustrations of various well patterns and the displacement zones defined by such patterns;

FIGURE 3 is an illustration showing the effect of adsorption on the darcy viscosity of a shear-thinning liquid; and FIGURE 4 is an illustration showing a quadrant of the displacement zone defined by a five-spot well pattern and illustrating the relative increase in sweep efficiency obtained by the invention.

Description of specific embodiments

The present invention is carried out utilizing spaced injection and production wells defining a displacement zone in a subterranean oil reservoir. By the term "displacement zone," as used herein and in the appended claims, is meant a volume of the reservoir equal to that underlying a geometric figure defined by one or more squares having the injection well and the production well or wells associated therewith at opposed corners thereof. The displacement zone as so defined is thus the portion of the reservoir through which a medium introduced through the injection well ideally flows in radial geometry and which also is subtended by a 90° angle from the production well bisected by a line between the production well and the injection well. This is the maximum portion of the reservoir from which oil can be displaced by the injected medium into the production well, even assuming perfect radial flow from the injection well into the reservoir and from the reservoir into the production well.

The injection and production wells may be located and spaced from one another in any desired arrangement. For example, the so-called "line flood" pattern may be utilized, in which case the injection and production wells are located in rows extending generally parallel to one another. Other arrangements which may be used include those in which a central injection well is surrounded by a plurality of production wells. Such an arrangement may be a five-spot, seven-spot, or nine-spot pattern.

Turning now to the drawings, there are illustrated in FIGURES 1 and 2 various well arrangements and the "displacement zone," as that term is used herein, defined by such well arrangements. In FIGURES 1 and 2 the legend ● is used to indicate a production well and the legend ○ is used to indicate an injection well. In FIGURE 1 there is illustrated a well arrangement having an injection well 10 and a spaced production well 12. In this case, the displacement zone is simply that portion of the reservoir underlying the square 14 of which the wells 10 and 12 are at opposed corners. In FIGURE 2 there are illustrated a plurality of five-spot patterns, one of which comprises a central injection well 16 and peripheral production wells 18, 19, 20, and 21. Considering only the production well 18 and the injection well 16, the displacement zone for these two wells is that portion of the reservoir underlying the square 18a bounded by broken and solid lines. A similar displacement zone exists for the injection well 16 and each of the other associated production wells 19, 20, and 21, and the total displacement zone for the injection well 16 is equal to that portion of the reservoir underlying the square having the production wells 18, 19, 20, and 21 at the corners thereof and the injection well 16 in the center thereof.

The phenomenon of adsorption whereby a solute, either in true solution or in a colloidal dispersion, in a carrier liquid is deposited on solid surfaces contacted by the carrier liquid is well known to those skilled in the art. This phenomenon is manifested in secondary recovery operations such as waterflooding in which solutes dissolved or dispersed in the injected water tend to be adsorbed from the water onto the rock surfaces within the reservoir. In fact, this tendency is so pronounced that it has proven to be a major obstacle to the success of such operations as the so-called polymer flood in which organic polymers which act as viscosifiers are dissolved or dispersed in an aqueous flooding medium. Oftentimes the rate of adsorption is so high that it is economically impractical to maintain the polymeric materials in adequate concentrations in the floodwater.

The amount of a solute adsorbed from a carrier liquid onto a given surface area of reservoir rock depends, within limits, upon the concentration of the solute in the liquid. The higher the concentration, the greater the amount of solute that will be adsorbed. When a solution or dispersion is placed in contact with an adsorbing reservoir rock the amount of solute adsorbed will gradually increase and the concentration of the solute in the carrier liquid will decrease until an equilibrium concentration is established at which the rates of desorption and adsorption are equal. If the concentration of solute in the carrier liquid is then increased, the amount of adsorbate will increase to a new equilibrium value and, conversely, if the concentration is decreased the adsorbent reservoir rock will lose adsorbed solute to the surrounding liquid until equilibrium is once again established. This relationship will exist for a given adsorbent-solute-liquid system until such time as substantially all adsorption sites on the adsorbent are satisfied. Thereafter, an increase of solute in solution will result in little or no additional solute being adsorbed on the adsorbent. At this point, the system has reached a state of saturation-adsorption. The maximum amount of solute which can be adsorbed from a given carrier liquid per unit volume or weight of adsorbent is termed the "saturation-adsorption value" of the solute for the particular liquid adsorbent system and is a measure of the capacity of this solute to be adsorbed from the liquid.

While adsorption thus presents great difficulties in polymer flooding operations, it also enhances the efficacy of such operations by increasing the apparent or "darcy" viscosity of the flooding medium as it flows through the reservoir. This phenomenon is illustrated in FIGURE 3 which is a plot of shear rate S on the abscissa versus the darcy viscosity V on the ordinate, with and without adsorption, for an aqueous solution of an adsorbing viscosifier which acts as a shear-thinning agent. As will be understood by those skilled in the art, by the term "shear-thinning" is meant that characteristic whereby a liquid exhibits a decrease in viscosity with an increase in shear rate. The property of shear-thinning thus enables a liquid to develop a relatively low viscosity when subjected to a high rate of shear in a subterranean formation. Such a high shear rate is induced, for example, when the liquid flows from the injection well into the reservoir. Due to the radial flow geometry attendant to the movement of the liquid between the formation and the well, the flow velocity and shear rate are much higher immediately adjacent the well than at more remote locations deeper into the formation. Thus, the effect of shear-thinning on viscosity during flow through a formation is confined to a relatively small area immediately adjacent the injection well and beyond this area the effect of shear-thinning is negligible.

In FIGURE 3 curve $a$ illustrates the darcy viscosity of the fluid when adsorption of the shear-thinning agent occurs and curve $b$ illustrates the darcy viscosity of this same solution but without such adsorption. As illustrated in FIGURE 3, at a given shear rate the darcy viscosity of the fluid medium as it flows through the formation is relatively high when adsorption occurs. However, when adsorption is eliminated or drastically reduced, as through the addition of a preferentially adsorbing sacrificial agent to the fluid medium, the darcy viscosity is lowered appreciably at this same shear rate. This of course results in a corresponding increase in the mobility of the flooding medium within the reservoir.

While applicant does not intend to be limited by any particular theory, it is thought likely that the observed increase in darcy viscosity as illustrated by curve $a$ of FIGURE 3 is a physical phenomenon due to deposition of the shear-thinning agent within the reservoir. More particularly, as the flooding medium moves through the reservoir with adsorption occurring, the shear-thinning agent is deposited on the rock surfaces forming the interstitial flow passages. This reduces the cross-sectional area for a particular passage available for flow of the flooding medium and results in the observed increase in the darcy viscosity of the flooding medium. By adding a sacrificial agent to the flooding medium the amount of shear-thinning agent deposited through adsorption is greatly reduced, thus causing a decrease in darcy viscosity as illustrated by curve b.

As noted previously, one factor leading to poor sweep efficiency is the tendency of the injected displacing medium to depart from radial flow shortly after injection and to flow preferentially in the direction of a production well. In the present invention this departure from radial flow is reduced or delayed in portions of the reservoir remote from the injection well while obtaining a relatively high degree of injectivity by providing in a portion of the displacement zone adjacent the injection well a sacrificial agent which preferentially adsorbs on the surfaces of the reservoir rock with respect to the viscosifier contained in the flooding medium. The sacrificial agent may be injected into the reservoir in the flooding medium containing the viscosifier or it may be injected in an aqueous medium which is introduced into the reservoir prior to the thickened flooding medium. In either case, the presence of the sacrificial agent will reduce the adsorption of the viscosifying agent, thus resulting in a decrease in the darcy viscosity of the flooding medium with an attendant increase in mobility of the flooding medium in that portion of the reservoir next adjacent the injection well.

Referring now to FIGURE 4 of the drawings, there is illustrated a quadrant of the displacement zone defined by a conventional five-spot well pattern such as that illustrated in FIGURE 2. Thus, in FIGURE 4, the injection well 30 may be considered to correspond to the injection well 16 shown in FIGURE 2 and the production well 32 corresponds to one of wells 18, 19, 20, and 21. FIGURE 4 is a schematic illustration which shows qualitatively the relative sweep efficiencies obtained when injecting water in accordance with conventional practice and when injecting in addition a sacrificial agent and an adsorbing viscosifier in accordance with the present invention. In FIGURE 4 broken lines 34a, 34b, and 34c illustrate the successive flood patterns which might be expected upon injection of oil field water. Thus, broken line 34a indicates the flood front at one stage of the flooding process, 34b indicates the flood front at some later stage, and broken line 34c indicates the flood front at a still later intermediate stage. Solid lines 36a, 36b, and 36c similarly illustrate the successive flood patterns which might be expected when utilizing a sacrificial agent and an adsorbing viscosifier in accordance with the present invention.

As can be seen from an examination of FIGURE 4, the injection of water as in a conventional waterflooding process is subject to severe distortion which becomes progressively worse. Thus, the injected displacing medium departs rapidly from the radial flow first associated with injection through well 30 and channels rather strongly in the direction of production well 32. On the other hand, when injecting a sacrificial agent and viscosifier, a relatively high degree of injectivity is achieved while obtaining good radial flow in the bulk of the displacement zone at locations remote from the injection well. Thus, even at the relatively late stage of the flooding process, as indicated by broken line 36c, the frontal pattern of the flooding medium has not departed greatly from radial flow. This increases the portion of the displacement zone which is subject to the displacing action of the flooding medium and of course increases the over-all oil recovery from the displacement zone.

It is to be recognized that the various flooding patterns illustrated in FIGURE 4 are highly schematized. In actual practice, the frontal pattern of the injected flooding medium during any stage of the process will depend upon such factors as vertical and horizontal permeability heterogeneities present in the reservoir, the viscosity of the displacing medium relative to the viscosity of the reservoir oil, and in addition the pressure gradient existing between the production well and the surrounding formation. Regarding the latter, it is to be noted that a high drawdown of the production well will enhance channeling of the flooding medium in the direction of the production well whereas a relatively low production well drawdown will encourage radial flow of the injected flooding medium.

The sacrificial agent may be contained in the aqueous solution of the viscosifier or it may be injected into the reservoir in a separate solution prior to introduction of the thickened aqueous solution. Also, the sacrificial agent may be contained both in a preceding aqueous medium and in the thickened aqueous medium. In any case, the sacrificial agent should be introduced into the reservoir in a total amount such that it satisfies the adsorption sites in a portion of the displacement zone next adjacent the injection well but still leaves additional more remote portions of the displacement zone unsaturated with the sacrificial agent. This results in a relatively high mobility of the thickened aqueous liquid in the area of the injection well with an attendant higher injectivity. On the other hand, as the flood front advances beyond the portion of the displacement zone containing the sacrificial agent, the darcy viscosity increases as indicated above with respect to FIGURE 3 and the attendant text, with the result that the mobility of the injected medium is decreased. This provides a lower mobility, thus alleviating the tendency of the flooding medium to finger in the direction of a production well as it approaches the same and enhancing the sweep efficiency of the waterflooding.

The sacrificial agent is introduced in the present invention in an amount to satisfy the adsorption sites in 0.05 to 0.50 of the displacement zone. In most cases it will be preferred to introduce the sacrificial agent in an amount which will satisfy the adsorption sites in 0.10 to 0.25 of the displacement zone. The total amount of sacrificial agent needed for this requirement can readily be determined through relatively simple test procedures carried out with regard to the reservoir rock and the sacrificial agent. Expressed mathematically, the total amount A to be introduced into the reservoir in accordance with the present invention may be defined by the following relationship:

$$A = XYFn \tag{1}$$

wherein:

A is the total weight amount of sacrificial agent injected,
X is the saturation-adsorption value of the sacrificial agent in the aqueous medium expressed in weight of sacrificial agent per weight of reservoir rock,
Y is the in-situ density of the reservoir rock,
F is the volume of the displacement zone, and
$n$ is a number within the range of 0.05 to 0.50 and preferably within the range of 0.10 to 0.25.

The above parameters can readily be determined through laboratory tests carried out with regard to the reservoir rock and the sacrificial agent in question. Thus, the value of X can be determined through adsorption tests in which a sample of the reservoir rock is disaggregated and then contacted with various concentrations of aqueous solutions of the sacrificial agent to be used in practicing the invention. The value of Y can be determined through common core analysis procedures and F may be closely approximated by means of seismic and/or well logging data available for the reservoir in question.

The value assigned $n$, i.e., the portion of the displacement zone to be saturated by the sacrificial agent, will depend upon various local factors such as the portion of the displacement zone which realistically can be expected to be contacted by the displacing medium. Thus, in a relatively homogeneous reservoir provided with five- or nine-spot patterns, such as illustrated in FIGURES 2 and 3 respectively, and with a relatively low drawdown at the production wells it normally will be desirable to select a relatively high value of $n$. On the other hand, where very poor sweep efficiency is expected, it usually will be desirable to select a lower value of $n$.

The preferred viscosifiers for use in carrying out the present invention are the partially hydrolyzed polyacrylamides, which are shear-thinning agents. These polymers typically exhibit a molecular weight of one million or more and exhibit a percent hydrolysis within the range of 2 to 67 percent. For a more detailed description of such partially hydrolyzed polyacrylamides, reference is made to U.S. Patent No. 2,827,964 to B. B. Sandiford et al. and U.S. Patent No. 3,039,529 to K. R. McKennon. Partially hydrolyzed polyacrylamides suitable for use in the invention are commercially available from the Dow Chemical Company, Midland, Mich., and are identified as the PUSHER series chemicals. Although it is preferred that the viscosifier be a shear-thinning agent, other viscosifiers, either Newtonian or non-Newtonian, which exhibit an increase in darcy viscosity due to adsorption thereof onto the reservoir rock surfaces may be utilized in the present invention. The tendency of a given viscosifier to adsorb on a particular reservoir rock and also the effect of such adsorption on the darcy viscosity of an aqueous solution of the viscosifier can be determined through laboratory tests carried out on cores taken from the formation of interest.

The sacrificial agents employed in the invention may be any molecular species which preferentially adsorbs on the reservoir rock surfaces with respect to the viscosifying agent employed in the aqueous flooding medium. Suitable sacrificial agents include the alkali metal and ammonium carbonates, with sodium carbonate being the most desirable from the standpoint of availability and economy. Further sacrificial agents which may be employed include the alkali metal polyphosphates such as sodium tripolyphosphate, sodium tetraphosphate, tetrasodium polyphosphate, sodium pyrophosphate, sodium acid pyrophosphate, and sodium metaphosphate. Other suitable sacrificial agents include ethylenediaminetetraacetic acid and sodium borate decahydrate.

Of the various sacrificial agents listed above, sodium tripolyphosphate and sodium carbonate will usually be preferred from the standpoint of availability and widespread compatibility with the reservoir rock and viscosifier in question. In most reservoirs, particularly those of low clays content, sodium carbonate will be the most effective sacrificial agent. Sodium tripolyphosphate is particularly effective in reservoirs exhibiting high clays content, particularly those of the montmorillonite group. Mixtures of sodium tripolyphosphate and sodium carbonate are also effective in reservoirs containing montmorillonite clays.

It is to be recognized that various sacrificial agents in addition to those disclosed herein may be utilized in the practice of the present invention. The efficacy of a material as a sacrificial agent in relation to specific reservoir rocks and viscosifiers may be determined through laboratory tests carried out with regard to the reservoir rock and viscosifier in question. For example, adsorption tests in which a sample of reservoir rock is disaggregated and then contacted with the various strength aqueous solutions of a proposed sacrificial agent and viscosifier may be carried out in order to obtain saturation-adsorption values for the sacrificial agent and the viscosifier.

It is preferred that the sacrificial agent be employed in a relatively concentrated aqueous solution regardless of whether the agent is injected prior to or with the aqueous medium containing the viscosifier. This will ensure rapid and complete saturation of the saturation sites in that portion of the displacement zone adjacent the injection well. It is preferred that the sacrificial agent be employed in a concentration of at least one percent by weight and it usually will be desirable to employ the sacrificial agent in a concentration of at least five percent by weight. The upper concentration limit of the sacrificial agent will of course be determined by the solubility of the sacrificial agent and its compatibility with the viscosifier.

The flooding medium containing the viscosifier may be injected in any suitable amount. Usually it will be desirable to include the viscosifier in only an initial portion of the aqueous liquid and to follow this with unthickened liquid. However, thickened aqueous liquid containing the viscosifier may be injected throughout the process.

Having described specific embodiments of the instant invention, it will be understood that further modifications thereof may be suggested to those skilled in the art, and it is intended to cover all such modifications as fall within the scope of the appended claims.

What is claimed is:
1. In the recovery of oil from a subterranean reservoir penetrated by at least one injection well and at least one spaced production well defining a displacement zone in said reservoir the method comprising:
   injecting into said reservoir through said injection well a sacrificial agent which preferentially adsorbs on the surfaces of said reservoir with respect to the hereinafter defined viscosifier, said sacrificial agent being injected in an amount A as defined by the relationship:

$$A = XYFn$$

wherein:
   A is the total weight amount of sacrificial agent injected.
   X is the saturation-adsorption value of the sacrificial agent in the hereinafter recited aqueous flooding liquid in weight of sacrificial agent per weight of reservoir rock,
   Y is the in-situ density of the reservoir rock,
   F is the volume of the displacement zone, and
   n is a number within the range of 0.05 to 0.5;
   injecting into said reservoir through said injection well an aqueous flooding liquid containing a viscosifier which adsorbs on the surfaces of said reservoir, and recovering oil from said production well.

2. The method of claim 1 wherein $n$ is within the range of 0.10 to 0.25.

3. The method of claim 1 wherein said viscosifier is a shear-thinning agent.

4. The method of claim 3 wherein said shear-thinning agent is a partially hydrolyzed polyacrylamide.

5. The method of claim 1 wherein said sacrificial agent is injected into said reservoir in an aqueous solution of at least one percent by weight.

6. The method of claim 1 wherein said sacrificial agent is injected into said reservoir in an aqueous solution of at least five percent by weight.

7. The method of claim 1 wherein said sacrificial agent is injected into said reservoir contained in said aqueous flooding liquid.

8. The method of claim 1 where said sacrificial agent is injected into said reservoir contained in an aqueous liquid injected prior to the injection of said aqueous flooding liquid.

References Cited
UNITED STATES PATENTS
3,302,713 2/1967 Ahearn et al. _____ 166—275 X
3,369,602 2/1968 Fallgatter et al. _____ 166—273

CHARLES E. O'CONNELL, Primary Examiner

I. A. CALVERT, Assistant Examiner